UNITED STATES PATENT OFFICE.

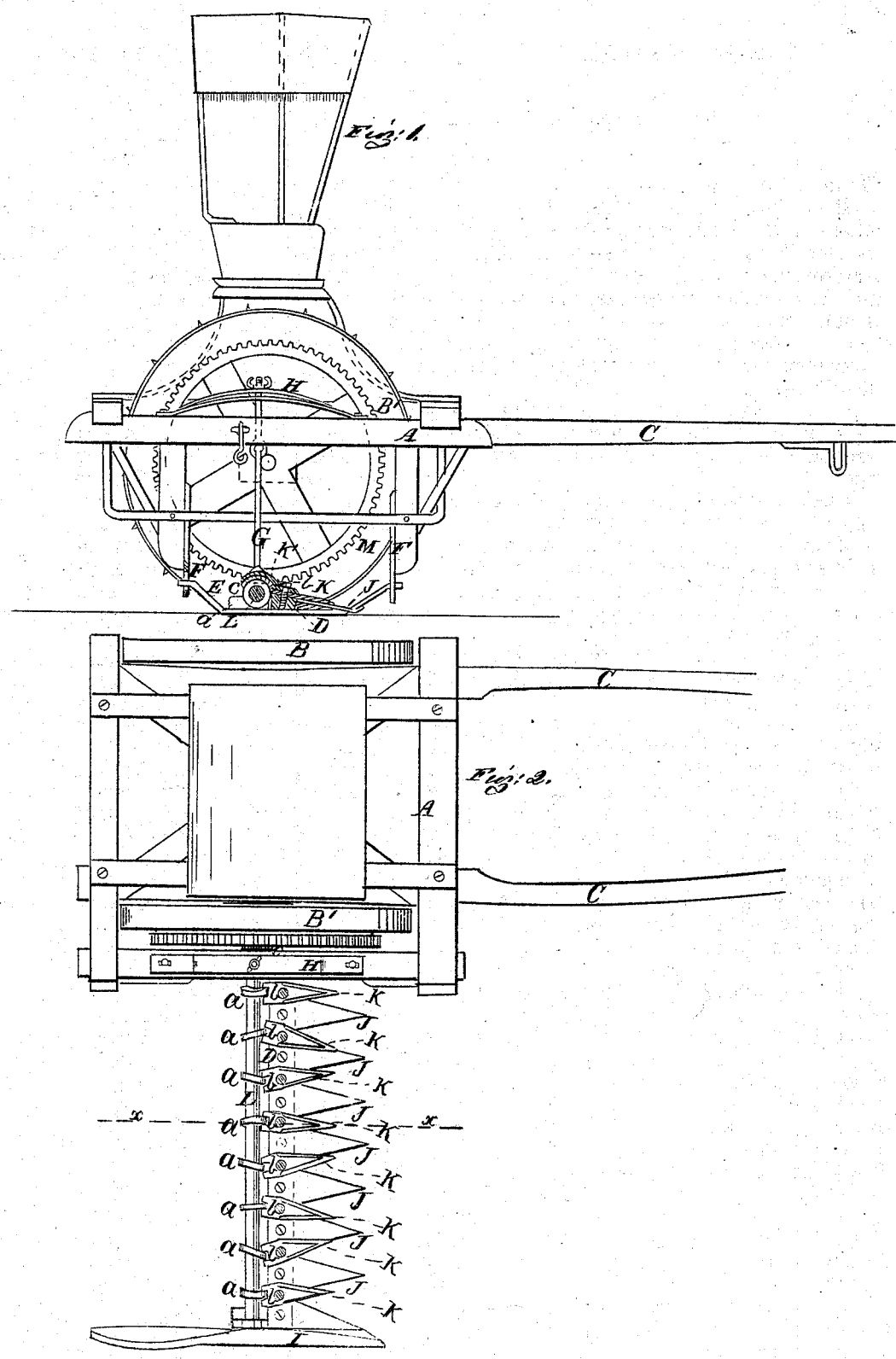

O. STODDARD, OF BUSTI, NEW YORK.

IMPROVEMENT IN GRAIN AND GRASS HARVESTERS.

Specification forming part of Letters Patent No. 15,672, dated September 2, 1856.

*To all whom it may concern:*

Be it known that I, OREN STODDARD, of Busti, in the county of Chautauqua and State of New York, have invented a new and useful Improvement in Grain and Grass Harvesters; and I do hereby declare that the following is a full, clear, and exact description of the same, reference being had to the annexed drawings, making a part of this specification, in which—

Figure 1 is a transverse section of my improvement, x x, Fig. 2, showing the plane of section. Fig. 2 is a plan or top view of the same.

Similar letters of reference indicate corresponding parts in the two figures.

My invention consists in an improved cutting device so arranged and operating that a continuous cut is obtained and the machine made to work with an equal power or draft as it is drawn along.

To enable those skilled in the art to fully understand and construct my invention, I will proceed to describe it.

A represents the main frame of the machine, supported by wheels B B', and having shafts C or a draft-pole attached to it.

D represents the finger-bar, the inner end of which is attached at right angles to a bar, E, the ends of which are provided with tenons, which are fitted in slots at the lower ends of pendants F F, attached to the main frame. The bar E is connected by a rod, G, with a spring, H, on the upper part of the main frame, so as to give a certain degree of elasticity to the finger-bar and allow its inner end to yield or give and conform to the irregularities of the surface of the ground. The outer end of the finger-bar has the usual shoe, I, attached to it, which shoe runs upon the ground, and as the ends of the bars E are allowed to turn in the pendants F F it will be seen that the outer end of the finger-bar will rise and fall, so as to conform to the irregular surface of the ground. The finger-bar, also, when the machine is not to be used or is being drawn from place to place, may be raised and secured in an upright position, or nearly so, so as to be entirely free from the ground.

J represents the fingers, which are of triangular or saw-tooth form, and secured at equal distances apart to the finger-bar D, as shown clearly in Fig. 2.

K represents the cutters, which are also of triangular or saw-tooth form, as shown in Fig. 2. These cutters are smaller than the fingers J, and their inner ends are pivoted to the finger-bar, fitting between said bar and a plate, K', which is placed over the finger-bar, as shown in Fig. 1, the plate being omitted in Fig. 2. The cutters K are pivoted so as to be between the fingers.

L represents a shaft, which is placed directly back of the finger-bar D, said shaft having one of its bearings on the shoe I and the other on the bar E. The shaft L has a series of cams, $a$, upon it—one cam for each cutter. These cams are of circular form, and are placed more or less obliquely on the shaft L, each one having a different position from the others. (See Fig. 2.) The cams fit in notches or recesses $b$ in the back ends of the cutters K. The inner end of the shaft L has a pinion, $c$, upon it, which pinion gears into a toothed wheel, M, on the wheel B', and causes a rotary motion to be given the shaft L as the machine is drawn along. The cams $a$ give a vibratory motion to the cutters K, the cutting-edges of which work over the edges of the fingers J, the grass or grain being cut between the two.

In consequence of having the cams $a$ placed in different positions on the shaft L, the cutters K work irregularly—that is, no two of them are in the same position at the same time. Consequently the cut is a continuous one. There is no unequal power required to operate the cutting device. In the ordinary sickle the teeth are permanently attached to the sickle-bar, and they all pass directly over the fingers at the same moment, ceasing to cut and commencing to cut at the same time, thereby causing an unequal power, increasing the draft of the machine, and causing it to vibrate or jar, to the great injury of the working parts. The same difficulty would exist were the cutters K all in the same position.

I do not claim the pivoted cutters K irrespective of the peculiarity of their relative position or movement with each other, as herein shown.

What I claim therefore as new, and desire to secure by Letters Patent, is—

The cutters K, pivoted to the finger-bar D, and operated by the cams $a$ on the shaft L, when said cams are placed in varying positions, as described, for the purpose set forth.

OREN STODDARD.

Witnesses:
J. F. BUCKLEY,
WM. TUSCH.